(12) United States Patent
Jiang et al.

(10) Patent No.: US 12,017,395 B2
(45) Date of Patent: Jun. 25, 2024

(54) IN-SITU MICROFIBRILLATED REINFORCED POLYMER COMPOSITE HEAT-INSULATING FOAM MATERIAL AS WELL AS PREPARATION METHOD AND APPLICATION THEREOF

(71) Applicant: Zhengzhou University, Henan (CN)

(72) Inventors: Jing Jiang, Henan (CN); Lian Yang, Henan (CN); Junwei Sun, Henan (CN); Min Qiao, Henan (CN); Caiyi Jia, Henan (CN); Xiaofeng Wang, Henan (CN); Qian Li, Henan (CN)

(73) Assignee: Zhengzhou University, Henan (CN)

( * ) Notice: Subject to any disclaimer, the term of this patent is extended or adjusted under 35 U.S.C. 154(b) by 0 days.

(21) Appl. No.: 18/492,738

(22) Filed: Oct. 23, 2023

(65) Prior Publication Data
US 2024/0157619 A1    May 16, 2024

(30) Foreign Application Priority Data
Oct. 24, 2022    (CN) .......................... 202211301777.2

(51) Int. Cl.
| | | |
|---|---|---|
| *B29C 48/00* | (2019.01) | |
| *B29B 7/48* | (2006.01) | |
| *B29C 44/34* | (2006.01) | |
| *B29C 48/40* | (2019.01) | |
| *B29K 21/00* | (2006.01) | |
| *B29K 23/00* | (2006.01) | |
| *B29K 31/00* | (2006.01) | |
| *B29K 67/00* | (2006.01) | |
| *B29K 101/12* | (2006.01) | |
| *B29K 105/04* | (2006.01) | |
| *B29K 105/14* | (2006.01) | |

(52) U.S. Cl.
CPC ............ *B29C 48/0018* (2019.02); *B29B 7/48* (2013.01); *B29C 44/3415* (2013.01); *B29C 48/40* (2019.02); *B29K 2021/003* (2013.01); *B29K 2023/12* (2013.01); *B29K 2031/04* (2013.01); *B29K 2067/003* (2013.01); *B29K 2101/12* (2013.01); *B29K 2105/04* (2013.01); *B29K 2105/14* (2013.01); *B29K 2995/0015* (2013.01); *B29K 2995/0097* (2013.01)

(58) Field of Classification Search
CPC ...... B29C 2045/1723; B29C 45/14786; B29C 70/523; B29C 70/521; B29C 70/52; B29C 70/506; B29C 70/34; B29C 70/20; B29C 70/083; B29C 70/081; B29C 70/08; B29C 70/06; B29C 70/04; B29C 70/026; B29C 70/02; B29C 51/04; B29C 44/3415; B29C 48/40; B29C 48/0018
See application file for complete search history.

*Primary Examiner* — Stella K Yi
(74) *Attorney, Agent, or Firm* — JCIPRNET

(57) ABSTRACT

The disclosure belongs to the technical field of heat insulation materials, and discloses an in-situ microfibrillated reinforced polymer composite heat insulation foam material as well as a preparation method and application thereof. This disclosure adopts a polypropylene matrix, a fiber-forming polymer, an elastomer and an antioxidant as a foam material. The foaming material is subjected to a primary melt blending process and a hot stretching process first, then subjected to a secondary melt blending process and cooling granulation and subjected to a pressing process, and a composite board is obtained. The composite board is subjected to supercritical fluid foaming process, and a composite heat insulation foam material is obtained.

7 Claims, 4 Drawing Sheets

IN-SITU MICROFIBRILLATED REINFORCED POLYMER COMPOSITE HEAT-INSULATING FOAM MATERIAL AS WELL AS PREPARATION METHOD AND APPLICATION THEREOF

CROSS-REFERENCE TO RELATED APPLICATION

This application claims the priority benefit of China application serial no. 202211301777.2, filed on Oct. 24, 2022. The entirety of the above-mentioned patent application is hereby incorporated by reference herein and made a part of this specification.

BACKGROUND

Technical Field

The disclosure belongs to the technical field of heat insulation materials, and specifically discloses an in-situ microfibrillated reinforced polymer composite heat insulation foam material as well as a preparation method and application thereof.

Description of Related Art

As the automobile industry continues to develop rapidly, it has become a trend to adopt safer, more comfortable, and lighter materials. Therefore, it is of great significance to reduce material density and energy consumption while maintaining good mechanical properties of the material. In terms of materials for bumper, interior parts, steering wheel, etc., the use of low-density, high-performance polypropylene foam may not only reduce the weight of a car, increase driving comfort and controllability of the car, but also effectively reduce energy consumption. Moreover, polypropylene may be easily recycled for reuse, so it is possible to reduce resource consumption. In light of the above, polypropylene foam becomes a favorable choice as a material in making lightweight automobiles. However, after polypropylene is foamed, there is a significant strength loss of polypropylene, which will considerably reduce the mechanical properties and heat insulation properties of polypropylene foam, limiting the use of polypropylene foam. At present, there is room for improvement for polypropylene foam materials in terms of properties of strength reinforcement and heat insulation.

SUMMARY

In view of the problems and deficiencies existing in the related art, the object of the present disclosure is to provide an in-situ microfibrillated reinforced polymer composite heat insulation foam material as well as a preparation method and application thereof.

Based on the above purpose, the present disclosure adopts the following technical solutions.

The first aspect of the present disclosure provides a method for preparing an in-situ microfibrillated reinforced polymer composite heat insulation foam material. The preparation method is as follows: a foaming material is subjected to a primary melt blending process and a hot stretching process to obtain composite splines with oriented microfibers; then the composite splines are subjected to a secondary melt blending process and cooling granulation and then subjected to a pressing process, and a composite board is obtained. The composite board is subjected to supercritical fluid foaming process, and a composite heat insulation foam material is obtained.

The foaming material includes a matrix polymer, a fiber-forming polymer and an elastomer; the matrix polymer and the fiber-forming polymer are both thermoplastic polymers, and the elastomer is a thermoplastic elastomer.

Preferably, in the foaming material, the mass of the matrix polymer accounts for 80 wt. % to 99 wt. % of a sum of the mass of the matrix polymer and the mass of the fiber-forming polymer, and the mass of the fiber-forming polymer accounts for 1 wt. % to 20 wt. % of a sum of the mass of the matrix polymer and the mass of the fiber-forming polymer. The amount of the elastomer is 3 wt. % to 10 wt. % of a sum of the mass of the matrix polymer and the mass of the fiber-forming polymer.

More preferably, the mass of the fiber-forming polymer accounts for 7 wt. % to 12 wt. % of a sum of the mass of the matrix polymer and the mass of the fiber-forming polymer. The fiber-forming polymer with such mass percentage may be dispersed uniformly in the matrix polymer with gaps, so it is not only suitable for subsequent foaming process, but also enables the prepared foam material to have high mechanical strength.

Preferably, the foaming material further includes an antioxidant; the amount of the antioxidant is 0.1 wt % to 1 wt % of the sum of the mass of the matrix polymer and the mass of the fiber-forming polymer. More preferably, the antioxidant is an antioxidant 1010 or/and an antioxidant 168.

Preferably, the matrix polymer is polypropylene (PP). More preferably, the matrix polymer is isotactic polypropylene.

More preferably, the melt index of the polypropylene is 2 g to 30 g/10 min. More preferably, the polypropylene is Z30S, T30S or HJ500.

Preferably, the fiber-forming polymer is one of polyethylene terephthalate (PET), polytetrafluoroethylene (PTFE) or nylon 66. More preferably, the fiber-forming polymer is polyethylene terephthalate.

More preferably, the polyethylene terephthalate is FC510.

Preferably, the elastomer is one of ethylene-octene copolymer (POE), polystyrene-polyethylene-polybutylene-polystyrene block copolymer (SEBS) or ethylene-vinyl acetate copolymer (EVA). More preferably, the elastomer is an ethylene-octene copolymer.

Preferably, the amount of octene in the ethylene-octene copolymer is 25 wt. % to 40 wt. %; the presence of soft octene curl structure in POE may improve the connection buffering effect of various components. However, the amount of octene should not be too high, otherwise the hardness of the copolymer material will be affected.

More preferably, the foaming material is also dried before the melt blending process.

Preferably, a twin-screw extruder is adopted to carry out the primary melt blending process. In polymer composites that have undergone the primary melt blending process, when the fiber-forming polymer is PET or nylon 66, there will be no fiber-forming polymer microfibers in the PP matrix. However, when the fiber-forming polymer is PTFE, PTFE microfibers are generated in the PP matrix, which depends on the characteristics of the material itself.

Preferably, the setting conditions of the twin-screw extruder are: extrusion temperature is 120° C. to 270° C., the rotation speed of the screw is 70 rad/min to 90 rad/min, and the rotation speed of the lower hopper is 6 rad/min to 9 rad/min. More preferably, the zones 1 to 6 of the twin-screw extruder and die temperature are set according to the following sequence: 120° C. to 140° C., 150° C. to 170° C., 185° C. to 195° C., 220° C. to 240° C., 255° C. to 270° C., 255° C. to 270° C., and 250° C. to 260° C.

Preferably, a variable speed roller is adopted to perform the hot stretching process. The hot-stretched polymer composite splines are macroscopically exhibited as filaments with a diameter of 150 μm to 300 μm. Further, the internal manifestations of the filaments are: fiber-forming polymers are evenly distributed in the PP matrix in the form of microfibers, and the microfibers have directional orientation along the direction of hot stretching.

Preferably, the traction speed of the hot stretching process is 5 μm/s to 13 μm/s.

More preferably, the rotation speed of the variable speed roller is 500 r/min to 900 r/min; the diameter of the variable speed roller is 25 cm. Therefore, it may be calculated that the traction speed of the hot stretching process is 392.5 μm/min to 706.5 μm/min, that is, 6.5 μm/s to 11.8 μm/s. More preferably, the traction speed of the hot stretching process is 6 μm/s to 12 μm/s.

Preferably, a single-screw extruder is adopted to carry out the secondary melt blending process. In order to make the fiber-forming polymer microfibers evenly distributed in the matrix in the form of a fiber network and make the foaming material isotropic, it is required for the polymer composite splines obtained through the above hot stretching process to be subjected to a secondary melt blending process. Further, in order not to destroy the microfiber morphology of the fiber-forming polymer, a single-screw extruder with smaller shear force is selected for the secondary melt blending process.

Preferably, the temperature of the single-screw extruder is 190° C. to 200° C., the screw rotation speed is 70 rad/min to 90 rad/min, and the rotation speed of the lower hopper is 6 rad/min to 9 rad/min.

More preferably, a vacuum laminator is adopted to compress the cooled grains obtained from the single-screw extruder; the setting conditions for the vacuum laminator are: pressure is 0 kg to 5000 kg, and the temperature is 180° C. to 200° C.

Further, the pressed composite board is subjected to etching PP matrix processing, and it may be observed that the fiber-forming polymer microfibers have been formed into a fiber network structure.

Preferably, the thickness of the composite board is 2 mm to 5 mm.

More preferably, the supercritical fluid is carbon dioxide or nitrogen.

Preferably, in the supercritical fluid foaming process, the saturation temperature is 140° C. to 160° C., the saturation pressure is 2800 psi to 3000 psi, and the saturation time is 0.5 hours to 1.5 hours. More preferably, the saturation temperature in the supercritical fluid foaming process is 152° C. to 158° C.

The second aspect of the present disclosure provides a composite heat insulation foam material prepared by the preparation method described in the first aspect of the present disclosure. From a microscopic perspective, the diameter of foamed pores in the composite heat insulation foam material is less than 15 μm, and the density of foamed pores is higher than 108 piece/cm³. From a macro perspective, the density of the composite heat insulation foam material may reach 0.32 g/cm³; the compressive strength may reach 12.34 MPa.

The third aspect of the present disclosure provides the application of the composite heat insulation foam material described in the first aspect of the present disclosure in heat insulation materials. The thermal conductivity of the composite heat insulation foam material may reach 0.068 $W \cdot K^{-1} \cdot m^{-1}$.

Compared with related art, the advantageous effects of the present disclosure are as follows.

(1) The present disclosure adopts PP+PET+POE as raw materials, and utilizes the in-situ fiber forming technology, which is carried out by means of twin-screw extruder performing blending extrusion-hot stretching device performing hot stretching process-extraction cooling process, to form a stable PET nanoscale fiber network structure in the PP matrix to realize modification of PP. Furthermore, a high-strength in-situ microfibrillated reinforced polymer composite heat insulation foam material is prepared by combining supercritical fluid foaming technology with intermittent microcellular foaming process. In one of the embodiments, the density of the PP/PET/POE blend in-situ microfibrillated reinforced polymer composite heat insulation foam material prepared from ordinary isotactic polypropylene reaches 0.32 g/cm³, and the compressive strength is 12.34 MPa, the size of foamed pores is 6.87 μm, the density of foamed pores is 7.84×10⁹ piece/cm³, and the thermal conductivity is 0.068 $W \cdot K^{-1} \cdot m^{-1}$. As compared with the PP/PET/POE foam material not subjected to the hot stretching process, the compressive strength of the foam material of the present disclosure is increased by five times, the density of the foamed pores is increased by three orders of magnitude, and the thermal conductivity is also reduced by nearly 90%. Therefore, the in-situ microfibrillated reinforced polymer composite heat insulation foam material of the present disclosure has small foamed pores with high density, low thermal conductivity, high compressive strength as well as high heat insulation ability and good resistance to pressure. In summary, the present disclosure not only overcomes the deficiencies in the compressive strength and heat insulation performance of the existing polypropylene foam material, but also greatly improves the compressive strength and heat insulation properties of the polypropylene foam material, so that the polypropylene foam material has broad development prospects in the field of automobiles.

(2) In the present disclosure, during the processing of the blending system with PP as the matrix and PET as the fiber-forming phase, the fiber-forming phase PET forms oriented microfibers under shearing and stretching process, and a PET microfiber network is formed in the PP matrix after the secondary melt blending process, which considerably enhances the melt strength of PP and improves the compressive strength of the foam. Generally speaking, the lower the density of foaming products, the higher the melt strength of polypropylene required. The present disclosure adopts isotactic polypropylene with ordinary melt strength to prepare foam products with a density of 0.32 g/cm³, which further proves that the PP/PET/POE blend in-situ microfibrillated reinforced polymer of the present disclosure has high melt strength. Furthermore, the present disclosure also expands the foaming temperature range of PP. In one of the embodiments, the PP/PET/POE blend in-situ microfibrillated reinforced polymer composite heat insulation foam material of the present disclosure is able to foam into closed porous with uniform size within the foaming temperature range of 142° C. to 160° C., so that it is possible for PP foam materials to take into account mechanical properties while satisfying various foaming degree requirements.
(3) The present disclosure adopts supercritical $CO_2$ or $N_2$ physical foaming agent, which is inexpensive, easily controllable in operations, non-toxic and pollution-free, green and environmentally friendly, and makes it possible to prepare the foam material with small foamed pores with high density and uniform size.
(4) The in-situ fiber forming technology and intermittent foaming method adopted in the present disclosure are simple, easy to control and reduce production costs.

DESCRIPTION OF THE EMBODIMENTS

Figure 1:
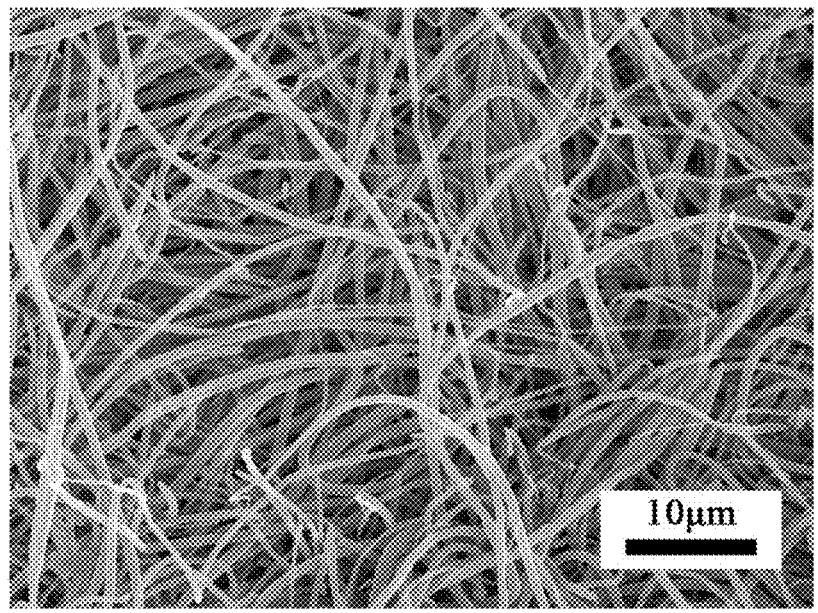
FIG. 1 is a microscopic morphology diagram of a PET fiber network in a composite board sample prepared in Example 1 of the present disclosure.
Figure 2:
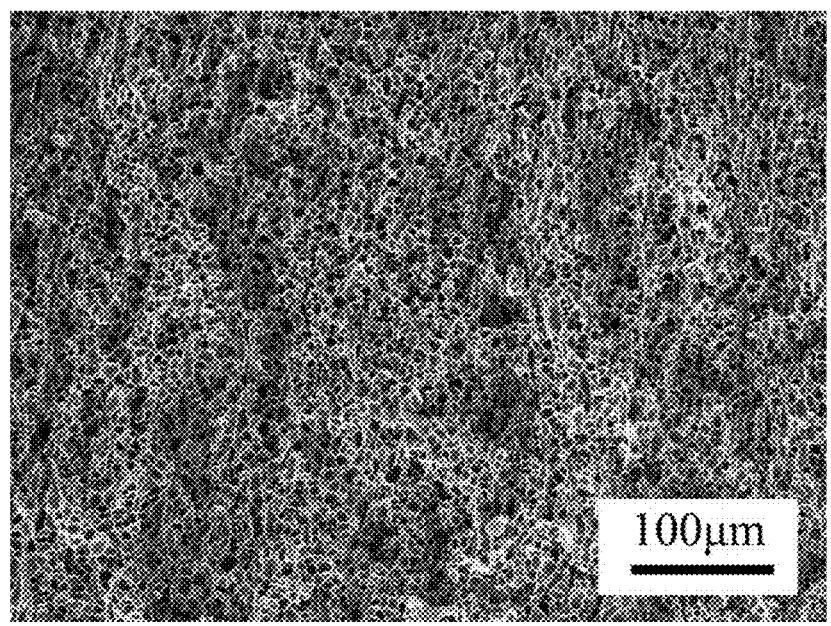
FIG. 2 is a microscopic morphology diagram of a cross-section in the thickness direction of the foam material sample prepared in Example 1 of the present disclosure.
Figure 3:
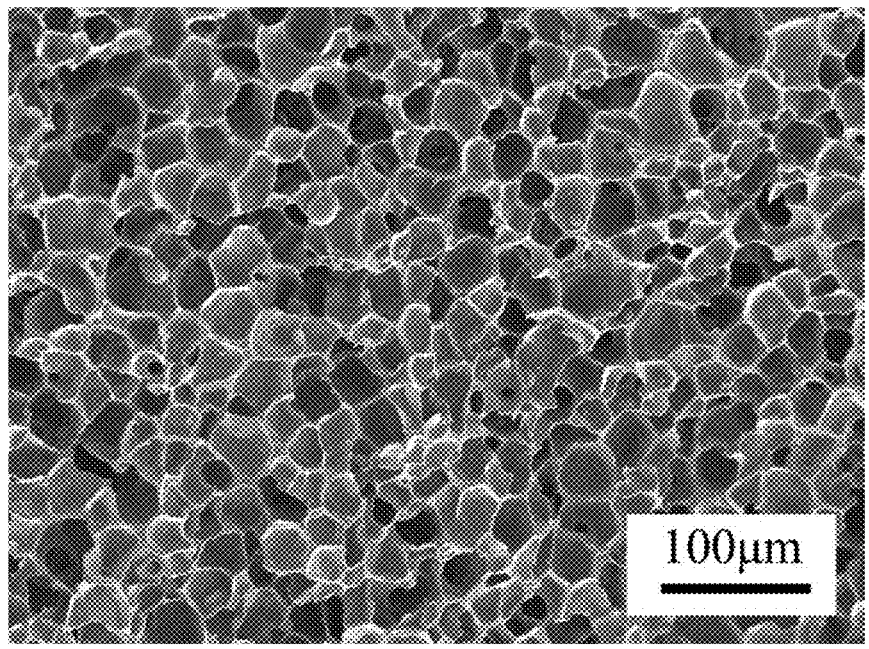
FIG. 3 is a microscopic morphology diagram of a cross-section in the thickness direction of the foam material sample prepared in Comparative Example 1 of the present disclosure.
Figure 4:
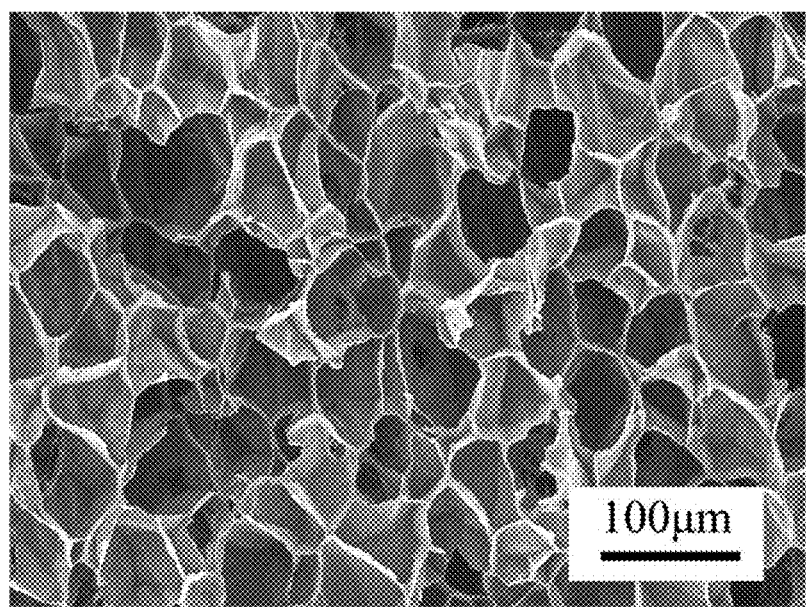
FIG. 4 is a microscopic morphology diagram of a cross-section in the thickness direction of the foam material sample prepared in Comparative Example 2 of the present disclosure.
Figure 5:
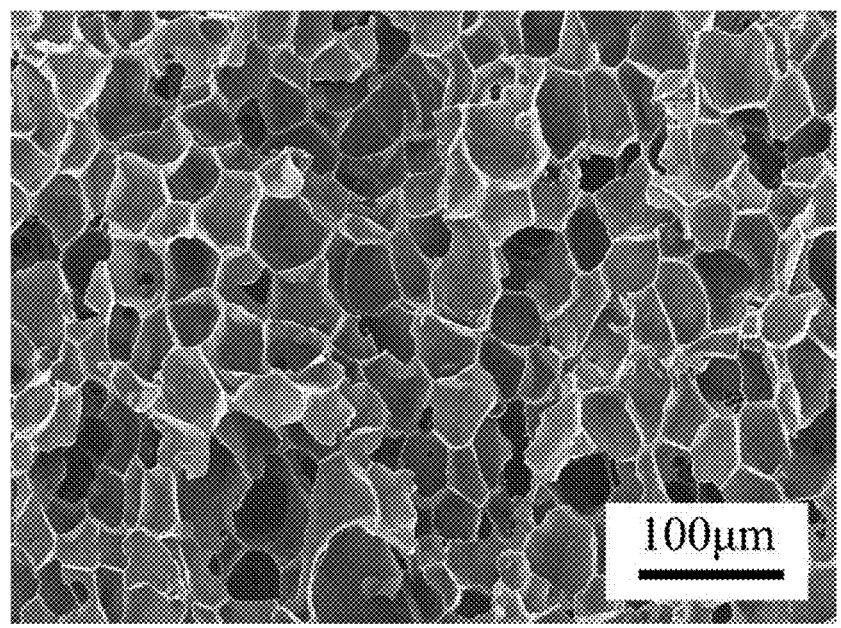
FIG. 5 is a microscopic morphology diagram of a cross-section in the thickness direction of the foam material sample prepared in Comparative Example 3 of the present disclosure.
Figure 6:
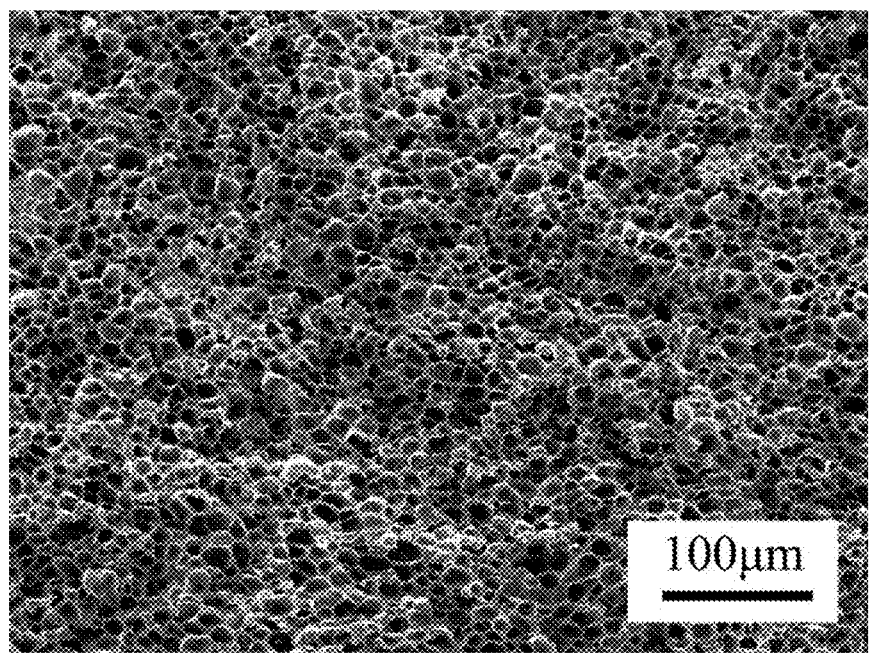
FIG. 6 is a microscopic morphology diagram of a cross-section in the thickness direction of the foam material sample prepared in Comparative Example 4 of the present disclosure.

In order to make the object, technical solution and advantages of the present disclosure clearer, the present disclosure will be further described in detail below in conjunction with the accompanying drawings and embodiments. It should be understood that the specific embodiments described here are only used to explain the present disclosure, not to limit the present disclosure.

It should be noted that the embodiments and features in the embodiments of the present application can be combined with each other as long as there is no conflict between them. The present disclosure will be described in detail below with reference to the accompanying drawings and embodiments.

It should be noted that the present disclosure observes the microscopic morphology of the cross-section in the thickness direction of the foam material sample through SEM, and counts the foamed pores structure parameters of the foam material sample. Furthermore, the composite board sample before foaming is also etched in a xylene solution at a temperature of 140° C. for 2 hours to etch away the PP matrix to obtain PET fibers and calculate the average diameter of fiber. The thermal conductivity of the foam material sample is measured according to the GB/T 10295-2008 standard. The compressive strength of the foam material sample is measured according to the GB/T 8813-2020 standard (compressive strength is the corresponding compressive stress value when the compressive strain is 80%).

(1) Discussion on Hot Stretching Process in Preparation Method of Composite Heat Insulation Foam Material In order to explore the effect of hot stretching process on the performance of the composite heat insulation foam material, the inventors conducted the following experiments respectively, namely Example 1 and Comparative Example 1. The corresponding hot stretching process is shown in Table 1. The performance measurement results of the prepared composite heat insulation foam materials are shown in Table 1.

Example 1

This embodiment provides an in-situ microfibrillated reinforced polymer composite heat insulation foam material, and the preparation method thereof includes the following steps:
(1) 1000 g of PP granules (supplier: Sinopec Maoming Petrochemical Company; item number: Z30S), 100 g of PET (supplier: Sinopec Yizheng Chemical Fiber Company Ltd.; item number: FC510), 50 g of POE (supplier: South Korea LG-DOW; item number: LC565), and 1.5 g of BASF antioxidant 1010 were dried and mixed evenly, and they were added to a twin-screw extruder for a melt blending process to obtain an extruded material. The zones 1 to 6 of the twin-screw extruder and die temperature were set according to the following sequence 130° C., 160° C., 190° C., 230° C., 265° C., 265° C., and 255° C. in sequence, the rotation speed of the screw was 70 rad/min, and the rotation speed of the lower hopper was 6.5 rad/min.
The melt index of the PP is 25 g/10 min, and relative density thereof is 0.91 g/cm$^3$; the intrinsic viscosity of PET is 0.675 dL/g, and the density thereof is 1.38 g/cm$^3$; the melt index of POE is 5 g/10 min, the density thereof is 0.87 g/cm$^3$, the Mooney viscosity thereof is 8 MU, and the amount of octene is 35 wt %.
(2) The extruded material was subjected to hot stretching process through a hot stretching device to obtain polymer filaments with oriented microfibers. The polymer filaments were added to a single-screw extruder for the secondary melt blending process, and subjected to cooling granulation to obtain the PP/PET/POE in-situ microfibrillated reinforced composite material. The hot stretching device consists of a cooling water tank and a variable speed roller (with a diameter of 25 cm) connected in sequence, and the speed of the variable speed roller is 700 r/min; the temperature of the single-screw extruder is 190° C. to 200° C.
(3) The PP/PET/POE in-situ microfibrillated reinforced composite material was subjected to a pressure pressing process under 190° C. through a vacuum laminating machine to obtain a 30×10×5 mm composite board. The composite board was placed in a sealed high-pressure kettle filled with supercritical carbon dioxide, and the saturation pressure was set to 3000 psi, the saturation temperature was set to 154° C., and the saturation time was maintained for 1 hour to fully integrate the supercritical fluid into the material to form a homogeneous system. Then the pressure was reduced rapidly and temperature was decreased, the pressure relief rate was 2 MPa/s to 3 MPa/s. After cooling, the in-situ microfibrillated reinforced polymer composite heat insulation foam material was obtained.

The density of the foam material prepared in this embodiment is 0.32 g/cm$^3$; the melting point of the PP/PET/POE in-situ microfibrillated reinforced composite material is 165° C. In addition, it can be seen from the morphology of the PET fibers of the composite board sample in FIG. 1 that the PET fibers are staggered and form a three-dimensional network structure with gaps in the PP matrix, which provides a basis for the space and mechanics in the subsequent formation of foamed pores.

Comparative Example 1

The content of a PP/PET/POE blend foam material is substantially the same as that of Example 1, except that the hot stretching process in step (2) was not performed, and the extruded material was directly cooled and granulated and subjected to the pressing process and foaming process in step (3) to obtain the PP/PET/POE blend foam material.

The density of the foam material prepared in this comparative example is 0.41 g/cm$^3$; the melting point of the extruded material before foaming is 163° C.

TABLE 1

The performance parameters of foam material sample in Example 1 and Comparative Example 1

| No. | Undergo hot stretching treatment or not | Average diameter of PET fiber (nm) | Average size of foamed porous (μm) | Density of foamed porous (piece/cm$^3$) | Thermal conductivity (W·K$^{-1}$·m$^{-1}$) | Compressive strength (MPa) |
|---|---|---|---|---|---|---|
| Example 1 | Yes. | 283 | 6.87 | 7.84 × 10$^9$ | 0.068 | 12.34 |
| Comparative Example 1 | No | — | 43.86 | 9.88 × 10$^6$ | 0.623 | 2.22 |

As can be seen from Table 1, in comparison between Comparative Example 1 and Example 1, the foam material prepared by performing in-situ microfibrillation process of PP/PET/POE blend was found to have PET fibers with an average diameter of 283 nm. As compared with the foam material which was only subjected to PP/PET/POE melt blend without hot stretching process, the size of foamed pores of the PET fibers of Example 1 was reduced from 43.86 μm to 6.87 μm; the density of foamed pores was increased from 9.88×10$^6$ piece/cm$^3$ to 7.84×10$^9$ piece/cm$^3$; the thermal conductivity dropped from 0.623 W·K$^{-1}$·m$^{-1}$ to 0.068 W·K$^{-1}$·m$^{-1}$, and the compressive strength was increased from 2.22 MPa to 12.34 MPa. The reason behind that above comparison result is there is a nanofiber network existing in Example 1 (as shown in FIG. 1, the average diameter of fiber is 283 nm), which greatly improves the melt strength of PP and increases the compressive strength of the foam material by 5 times. In the meantime, because heterogeneous nucleation of fiber increases the density of foamed pores by 3 orders of magnitude and reduces the thermal conductivity by nearly 90%, by performing in-situ microfibrillation process on PET in the PP/PET/POE melt blend, it is possible to greatly increase the density of foamed pores of the foam material, reduce the size of foamed pores, and enhance the mechanical properties and thermal insulation properties of the foam material.

(2) Discussion on the Types of Raw Materials in the Preparation Method of Composite Heat Insulation Foam Materials In order to explore the impact of type of raw materials on the performance of the composite heat insulation foam materials, the inventors conducted the following experiments, namely Example 1 and Comparative Examples 1 to 5 respectively. The corresponding raw material types are shown in Table 2. The performance measurement results of the prepared composite heat insulation foam materials are shown in Table 2.

Comparative Example 2

The content of a PP foam material is substantially the same as those in Example 1, except that 100 g of PET and 50 g of POE were not added in step (1); the hot stretching process in step (2) was not performed, and the extruded material was directly cooled and granulated and subjected to the pressing process and foaming process in step (3) to obtain a PP/PET blend foam material.

Comparative Example 3

The content of a PP/PET blend foam material is substantially the same as those in Example 1, except that 50 g of POE was not added in step (1); the hot stretching process in step (2) was not performed, and the extruded material was directly cooled and granulated and subjected to the pressing process and foaming process in step (3) to obtain a PP/PET blend foam material.

Comparative Example 4

The content of an in-situ microfibrillated reinforced polymer composite heat insulation foam material is substantially the same as that of Example 1, except that 50 g of POE was not added in step (1).

Comparative Example 5

The content of an in-situ microfibrillated reinforced polymer composite heat insulation foam material is substantially the same as that of Example 1, except that 100 g of PET was not added in step (1).

TABLE 2

Performance parameters of foam material samples in Example 1 and Comparative Examples 1 to 5

| No. | Raw material | Undergo hot stretching treatment or not | Average diameter of PET fiber (nm) | Average size of foamed porous (μm) | Density of foamed porous (piece/cm³) | Thermal conductivity (W·K⁻¹·m⁻¹) | Compressive strength (MPa) |
|---|---|---|---|---|---|---|---|
| Example 1 | PP/PET/POE | Yes | 283 | 6.87 | $7.84 \times 10^9$ | 0.068 | 12.34 |
| Comparative Example 2 | PP | No | — | 75.56 | $4.26 \times 10^6$ | 0.946 | 1.41 |
| Comparative Example 3 | PP/PET | No | — | 58.36 | $8.71 \times 10^6$ | 0.679 | 2.31 |
| Comparative Example 1 | PP/PET/POE | No | — | 43.86 | $9.88 \times 10^6$ | 0.623 | 2.22 |
| Comparative Example 4 | PP/PET | Yes | 390 | 14.34 | $4.73 \times 10^9$ | 0.076 | 11.23 |
| Comparative Example 5 | PP/POE | Yes | — | 68.42 | $2.86 \times 10^6$ | 0.974 | 1.19 |

It can be seen from Table 2 that, in the comparison between Comparative Example 3 and Comparative Example 2, the foam material prepared by adding PET to PP for melt blending had smaller foamed pores with greater density, lower thermal conductivity and greater compressive strength than the foam material not added with PET. The reason behind that is PET particles can be evenly dispersed in the matrix, which increases the melt strength of the matrix and improves the crystallization properties. Moreover, PET provides more heterogeneous nucleation points for growth of foamed pores, which significantly reduces the critical free energy barrier for system nucleation. Therefore, melt blending PET in PP helps to increase the density of foamed pores in foam materials, reduce the size of foamed pores, and enhance the mechanical properties and heat insulation properties of foam materials.

In the comparison between Comparative Example 3 and Comparative Example 1, the foam material prepared by further adding POE to the PP/PET for melt blending has slightly smaller foamed pores with slightly greater density, slightly lower thermal conductivity and slightly greater compressive strength than the foam material not added with POE. Therefore, although POE improves the performance of foam materials prepared from the PP/PET melt system, POE has little impact. The reason behind the result lies in that POE long-chain branched polymers will increase the degree of entanglement of molecular chains in the PP matrix, thus increasing the melt strength of the blend system and improving the foaming performance to a certain extent, but there is little impact.

In the comparison between Comparative Example 4 and Example 1, the foam material prepared by melt blending PP/PET/POE for in-situ microfibrillation, as compared with the foam material prepared by melt blending PP/PET for in-situ microfibrillation, has thinner fiber diameter (reduced from 390 nm to 283 nm). Therefore, the addition of POE helps to refine the size of PET fibers. In addition, adding POE to the microfiber system reduces the size of foamed pores from 14.34 μm to 6.87 μm, the density of foamed pores was increased from $4.73 \times 10^9$ piece/cm³ to $7.84 \times 10^9$ piece/cm³, the thermal conductivity dropped from 0.076 W·K⁻¹·m⁻¹ to 0.068 W·K⁻¹·m⁻¹, and the compressive strength was increased from 11.23 MPa to 12.34 MPa. Moreover, comparing Comparative Example 1 with Comparative Example 3, and comparing Example 1 with Comparative Example 4, the addition of POE makes a greater contribution to the foam material prepared by hot stretching process. The reason behind that lies in that, during the melt blending stage, the presence of an appropriate amount of POE may increase the viscosity of matrix, increase the stress transfer efficiency between the PP melt and PET droplets, and help refine the PET particle size. However, during the hot stretching stage, the increase in the viscosity of the PP matrix increases the friction at the interface between the matrix and the PET droplets during the fiber-forming process. Therefore, under the action of external stretching, the increase in friction force enhances the deformation ability of the droplets, which facilitates the PET droplets to deform and orient along the stretching direction, and gradually undergoes shape changes such as ellipsoids, oblate spheres, long spindles, thick fibers, etc., and finally deforms into thin fibers with a high aspect ratio. Fiber refinement may further increase the density of foamed pores, reduce the size of foamed pores, and improve the mechanical properties and heat insulation properties of foam materials.

Comparing Comparative Example 5 with Example 1, fibers cannot be formed in the foam material prepared by performing hot stretching after melt blending PP/POE. The reason behind that lies in that POE and PP have good compatibility and are not able to meet the viscosity ratio requirements for in-situ fiber formation. Therefore, POE cannot form into fibers as well as particles that are uniformly dispersed in the matrix to provide heterogeneous nucleation points for foam formation. Accordingly, the performance of the foam material prepared by performing hot stretching after melt blending PP/POE is even lower than that of the foam material prepared by melt blending PP/PET (see Comparative Example 3).

In addition, as can be seen from FIG. 2 to FIG. 6, the structure of foamed pores in Example 1 and Comparative Examples 1 to 4 is mainly closed pores, and the pore size is small and the pores are evenly distributed.

In summary, it is preferred to prepare foam materials by melt blending PP/PET/POE for in-situ microfibrillation.

(3) Discussion on Rotation Speed of Variable Speed Roller in Preparation Method of Composite Heat Insulation Foam Material In order to explore the impact of the rotation speed of the variable speed roller on the performance of the composite heat insulation foam material, the inventors conducted the following experiments, namely Examples 1 to 5 respectively. The corresponding rotation speeds of the variable speed roller were: 700 r/min, 300 r/min, 500 r/min, 900 r/min, and 1100 r/min, and the performance measurement results of the prepared composite heat insulation foam materials are shown in Table 3.

Example 2

The content of an in-situ microfibrillated reinforced polymer composite heat insulation foam material is substantially the same as that of Example 1, except that the rotation speed of the variable speed roller in step (2) was 300 r/min.

Example 3

The content of an in-situ microfibrillated reinforced polymer composite heat insulation foam material is substantially the same as that of Example 1, except that the rotation speed of the variable speed roller in step (2) was 500 r/min.

Example 4

The content of an in-situ microfibrillated reinforced polymer composite heat insulation foam material is substantially the same as that of Example 1, except that the rotation speed of the variable speed roller in step (2) was 900 r/min.

Example 5

The content of an in-situ microfibrillated reinforced polymer composite heat insulation foam material is substantially the same as that of Example 1, except that the rotation speed of the variable speed roller in step (2) was 1100 r/min.

and thermal conductivity exhibit a trend of decreasing first and increasing afterwards, and the pore density and compressive strength both exhibit a trend of increasing first and decreasing afterwards. The reason behind that lies in that when the stretching rate of the variable speed roller is too low, the PET fiber cannot be fully stretched, and the fiber aspect ratio is low, resulting in poor melt strength and crystallization properties, which hinders the improvement of foaming. However, when the rotation speed of the roller is too high, the fibers will break and form short fibers with a low aspect ratio, and therefore it is possible to form a stable three-dimensional physical entangled network structure. Therefore, it is preferable to use a roller rotation speed of 700 r/min for hot stretching process.

(4) Discussion on Amount of POE in Preparation Method of Composite Heat Insulation Foam Material In order to explore the impact of the amount of POE on the performance of the composite heat insulation foam material, the inventors conducted the following experiments respectively, namely Example 1 and Examples 6 to 9, and the corresponding amounts of POE were: 50 g, 30 g, 70 g, 100 g, and 125 g. The performance measurement results of the prepared composite heat insulation foam materials are shown in Table 4.

Example 6

The content of an in-situ microfibrillated reinforced polymer composite heat insulation foam material is substantially the same as that of Example 1, except that the amount of POE added in step (1) was 30 g.

Example 7

The content of an in-situ microfibrillated reinforced polymer composite heat insulation foam material is substantially the same as that of Example 1, except that the amount of POE added in step (1) was 70 g.

Example 8

The content of an in-situ microfibrillated reinforced polymer composite heat insulation foam material is substantially the same as that of Example 1, except that the amount of POE added in step (1) was 100 g.

Example 9

The content of an in-situ microfibrillated reinforced polymer composite heat insulation foam material is substantially the same as that of Example 1, except that the amount of POE added in step (1) was 125 g.

TABLE 3

Performance parameters of foam material samples in Examples 1 to 5

| No. | Rotation speed of variable speed roller (r/min) | Average diameter of PET fiber (μm) | Average size of foamed porous (μm) | Density of foamed porous (piece/cm$^3$) | Thermal conductivity (W · K$^{-1}$ · m$^{-1}$) | Compressive strength (MPa) |
|---|---|---|---|---|---|---|
| Example 1 | 700 | 283 | 6.87 | $7.84 \times 10^9$ | 0.068 | 12.34 |
| Example 2 | 300 | 524 | 18.78 | $9.67 \times 10^8$ | 0.123 | 8.69 |
| Example 3 | 500 | 332 | 11.57 | $3.71 \times 10^9$ | 0.085 | 9.57 |
| Example 4 | 900 | 317 | 9.86 | $4.89 \times 10^9$ | 0.078 | 10.13 |
| Example 5 | 1100 | 395 | 13.65 | $4.02 \times 10^9$ | 0.094 | 10.81 |

It can be seen from Table 3 that as the rotation speed of the variable speed roller increases, the fiber size, pore size,

TABLE 4

Performance parameters of foam material samples in Example 1 and Examples 6 to 9

| No. | Amount of added POE (g) | Average diameter of PET fiber (nm) | Average size of foamed porous (μm) | Density of foamed porous (piece/cm$^3$) | Thermal conductivity (W·K$^{-1}$·m$^{-1}$) | Compressive strength (MPa) |
|---|---|---|---|---|---|---|
| Example 1 | 50 | 283 | 6.87 | 7.84 × 10$^9$ | 0.068 | 12.34 |
| Example 6 | 30 | 357 | 10.23 | 4.66 × 10$^9$ | 0.096 | 10.87 |
| Example 7 | 70 | 326 | 9.86 | 2.13 × 10$^9$ | 0.113 | 8.64 |
| Example 8 | 100 | 395 | 12.56 | 1.43 × 10$^9$ | 0.174 | 6.58 |
| Example 9 | 125 | 432 | 15.64 | 8.58 × 10$^8$ | 0.256 | 4.42 |

It can be seen from Table 4 that as the amount of POE increases, the fiber size, pore size, and thermal conductivity exhibit a trend of decreasing first and increasing afterwards, and the pore density and compressive strength exhibit a trend of increasing first and decreasing afterwards. The reason behind that lies in that the POE elastomer dispersed at the interface between PP and PET has a compatibilization effect. As the amount of POE increases, the compatibilization effect becomes more obvious, resulting in enhanced interfacial adhesion between the matrix phase and the fiber-forming phase, and also increasing the difficulty for PET droplets to detach from the PP matrix along the stretching direction, thereby inhibiting the deformation and orientation of PET droplets during in-situ fiber formation. Therefore, it is preferable to add 50 g of POE to the 1000 g PP and 100 g PET system to prepare in-situ microfibrillated reinforced polymer composite heat insulation foam materials.

(5) Discussion on Saturation Temperature in Preparation Method of Composite Heat Insulation Foam Material In order to explore the effect of saturation temperature on the performance of the composite heat insulation foam material, the inventors conducted the following experiments respectively, namely Example 1 and Examples 10 to 12. The corresponding saturation temperatures were: 154° C., 152° C., 156° C. and 158° C., the performance measurement results of the prepared composite heat insulation foam materials are shown in Table 5.

Example 10

The content of an in-situ microfibrillated reinforced polymer composite heat insulation foam material is substantially the same as that of Example 1, except that the saturation temperature in step (3) was 152° C.

Example 11

The content of an in-situ microfibrillated reinforced polymer composite heat insulation foam material is substantially the same as that of Example 1, except that the saturation temperature in step (3) was 156° C.

Example 12

The content of an in-situ microfibrillated reinforced polymer composite heat insulation foam material is substantially the same as that of Example 1, except that the saturation temperature in step (3) was 158° C.

TABLE 5

Performance parameters of foam material samples in Example 1 and Examples 10 to 12

| No. | Saturation temperature (° C.) | Average size of foamed porous (μm) | Density of foamed porous (piece/cm$^3$) | Thermal conductivity (W·K$^{-1}$·m$^{-1}$) | Compressive strength (MPa) |
|---|---|---|---|---|---|
| Example 1 | 154 | 6.87 | 7.84 × 10$^9$ | 0.068 | 12.34 |
| Example 10 | 152 | 5.96 | 4.62 × 10$^9$ | 0.094 | 11.67 |
| Example 11 | 156 | 10.62 | 1.23 × 10$^9$ | 0.104 | 9.83 |
| Example 12 | 158 | 18.81 | 6.24 × 10$^8$ | 0.254 | 6.95 |

It can be seen from Table 5 that with the increase in the amount of POE added, the pore size and thermal conductivity exhibit a trend of decreasing first and increasing afterwards, and the pore density and compressive strength exhibit a trend of increasing first and decreasing afterwards. The reason behind that lies in that if the temperature is too high, the melt strength becomes low and the pore size becomes larger; if the temperature is too low, the melt strength is too high and it is difficult to foam the crystalline polymer, the pore size will be too small, and the pore size will be uneven, and the thermal conductivity becomes larger due to the low porosity of the foam. In addition, studies have shown that smaller pore diameters and uniform foamed pores help reduce the thermal conductivity of the foamed pores. Therefore, 154° C. is a preferable saturation temperature for preparing in-situ microfibrillated reinforced polymer composite heat insulation foam materials.

Performance Test:

The inventors only adjusted the saturation temperature in Example 1, Comparative Example 1, and Comparative Example 2 respectively, and measured the pore density of the prepared foam material at every 2° C. within the saturation temperature range of 140° C. to 160° C. The data results are shown in Table 6 below.

TABLE 6

Performance parameters of foam material samples in Example 1, Comparative Example 1 and Comparative Example 2
Pore density (piece/cm³)

| No. | Saturation temperature (° C.) | | | | | | | | | | |
|---|---|---|---|---|---|---|---|---|---|---|---|
| | 140 | 142 | 144 | 146 | 148 | 150 | 152 | 154 | 156 | 158 | 160 |
| Example 1 | $3.82 \times 10^6$ | $7.61 \times 10^6$ | $2.71 \times 10^7$ | $5.42 \times 10^7$ | $1.25 \times 10^8$ | $6.74 \times 10^8$ | $4.62 \times 10^9$ | $7.84 \times 10^9$ | $1.23 \times 10^9$ | $6.24 \times 10^8$ | $7.62 \times 10^7$ |
| Comparative Example 1 | $9.37 \times 10^4$ | $5.21 \times 10^5$ | $7.52 \times 10^5$ | $8.12 \times 10^5$ | $4.13 \times 10^7$ | $2.24 \times 10^7$ | $1.63 \times 10^7$ | $9.88 \times 10^6$ | $4.14 \times 10^6$ | $1.87 \times 10^6$ | $5.24 \times 10^5$ |
| Comparative Example 2 | $6.95 \times 10^4$ | $2.22 \times 10^5$ | $5.14 \times 10^6$ | $2.31 \times 10^6$ | $2.45 \times 10^7$ | $1.24 \times 10^7$ | $8.27 \times 10^6$ | $4.26 \times 10^6$ | $1.63 \times 10^6$ | $7.72 \times 10^5$ | $2.31 \times 10^5$ |

Figure 7:
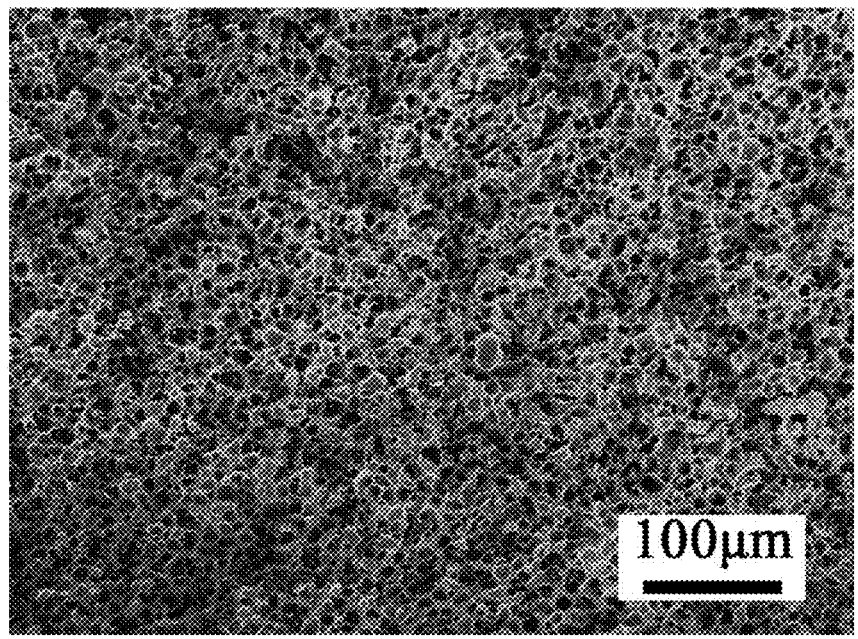
FIG. 7 is a microscopic morphology diagram of a cross-section in the thickness direction of the foam material sample prepared in Example 1 of the present disclosure when the saturation temperature is 142° C.
Figure 8:
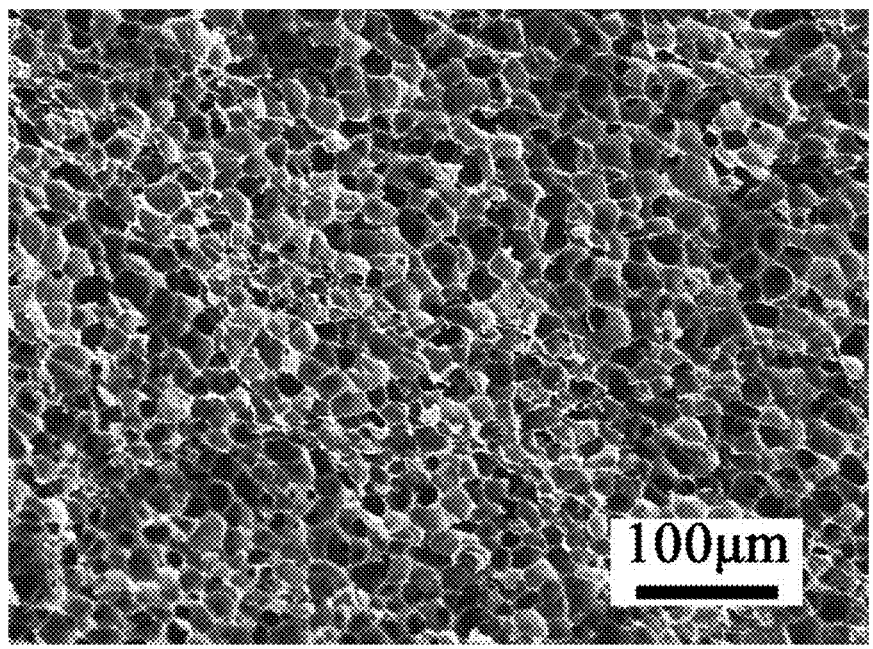
FIG. 8 is a microscopic morphology diagram of a cross-section in the thickness direction of the foam material sample prepared in Example 1 of the present disclosure when the saturation temperature is 160° C.

It can be seen from Table 6 that the pore density in Example 1, Comparative Example 1 and Comparative Example 2 exhibits a trend of increasing first and decreasing afterwards with the increase of saturation temperature. However, when the saturation temperature is at 142° C. to 160° C., the foam material sample of Example 1 still has mostly closed pores of uniform size (see FIG. 7 and FIG. 8 for details). The foam material sample of Comparative Example 1 has closed pores of uniform size when the saturation temperature is 142° C. to 156° C., but when the saturation temperature of Comparative Example 1 exceeds 156° C., there are collapsed pores or partially opened pores that are formed jointly. Therefore, the foaming temperature range of the foam material of Comparative Example 1 is narrower than that of Example 1, and the pore density is lower. In Comparative Example 2, the foam material sample has uniformly closed pores when the saturation temperature is 142° C. to 154° C. Under the condition where the saturation temperature is 156° C., there are also merger of foamed pores and collapsed pores. Therefore, the foaming temperature range of the foam material of Comparative Example 2 is narrower than that of Comparative Example 1, and the pore density is lower. Therefore, the introduction of PET fiber network not only increases the crystallinity of PP and enhances the melt strength of PP, but also expands the foaming temperature range of PP, which is more helpful for controlling the foaming process and making it easier to obtain independent foams with high porosity.

Example 11

The content of an in-situ microfibrillated reinforced polymer composite heat insulation foam material is substantially the same as that of Example 1, except that:

In step (1), 1000 g of PP particles, 250 g of PTFE, 125 g of POE, and 10 g of antioxidant 168 were dried and mixed evenly; the temperature of the twin-screw extruder was set to 140° C., 170° C., 195° C., 240° C., 270° C., 270° C., and 260° C.; the rotation speed of the screw was 90 rad/min, and the rotation speed of the lower hopper was 9 rad/min; wherein, the melt index of the PP was 30 g/10 min; the amount of octene in POE was 40 wt. %.

In step (3), the temperature of the vacuum laminator was set to 200° C.; the saturation pressure was 2800 psi, and the saturation time was 1.5 hours.

Example 12

The content of an in-situ microfibrillated reinforced polymer composite heat insulation foam material is substantially the same as that of Example 1, except that:

In step (1), 1000 g of PP particles, 50 g of nylon 66, 30 g of POE, and 1 g of antioxidant 168 were dried and mixed evenly; the temperature of the twin-screw extruder was set to 120° C., 150° C., 185° C., 220° C., 255° C., 255° C., and 250° C.; the rotation speed of the lower hopper was 6 rad/min; wherein, the melt index of the PP was 2 g/10 min; the intrinsic viscosity of nylon 66 was 0.3 dL/g; the amount of octene in POE was 25 wt %.

In step (3), the temperature of the vacuum laminator was set to 180° C.; the saturation pressure was 2800 psi, and the saturation time was 0.5 hours.

Example 13

The content of an in-situ microfibrillated reinforced polymer composite heat insulation foam material is substantially the same as that of Example 1, except that: POE was replaced with SEBS in step (1).

Example 14

The content of an in-situ microfibrillated reinforced polymer composite heat insulation foam material is substantially the same as that of Example 1, except that: POE was replaced with EVA in step (1).

In summary, the present disclosure effectively overcomes the deficiencies in the related art and has high industrial utilization value. The above embodiments serve to illustrate the substantial content of the present disclosure, but do not limit the scope of the present disclosure. Those of ordinary skill in the art should understand that the technical solution of the present disclosure can be modified or equivalently substituted without departing from the essence and protection scope of the technical solution of the present disclosure.

What is claimed is:

1. A preparation method for an in-situ microfibrillated reinforced polymer composite heat insulation foam material, including:
   subjecting a foaming material to a primary melt blending process and a hot stretching process to obtain composite splines with oriented microfibers;
   subjecting the composite splines to a secondary melt blending process, cooling granulation and a pressing process to obtain a composite board; and
   subjecting the composite board to a supercritical fluid foaming process to obtain the composite heat insulation foam material;
   wherein the foaming material comprises a matrix polymer, a fiber-forming polymer and an elastomer, the matrix polymer and the fiber-forming polymer are both thermoplastic polymers, and the elastomer is a thermoplastic elastomer;
   wherein the matrix polymer is polypropylene, the fiber-forming polymer is one of polyethylene terephthalate, polytetrafluoroethylene and nylon 66, and the elastomer is one of ethylene-octene copolymer, polystyrene-polyethylene-polybutylene-polystyrene block copolymer (SEBS) and ethylene-vinyl acetate copolymer.

2. The preparation method according to claim 1, wherein in the foaming material, a mass of the matrix polymer accounts for 80 wt. % to 99 wt. % of a sum of the mass of the matrix polymer and a mass of the fiber-forming polymer, and the mass of the fiber-forming polymer accounts for 1 wt. % to 20 wt. % of a sum of the mass of the matrix polymer and the mass of the fiber-forming polymer, and an amount of the elastomer is 3 wt. % to 10 wt. % of a sum of the mass of the matrix polymer and the mass of the fiber-forming polymer.

3. The preparation method according to claim 1, wherein the matrix polymer is isotactic polypropylene, and an amount of octene in the ethylene-octene copolymer is 25 wt. % to 40 wt. %.

4. The preparation method according to claim 1, wherein a traction speed of the hot stretching process is 5 μm/s to 13 μm/s.

5. The preparation method according to claim 1, wherein adopting a twin-screw extruder to carry out the primary melt blending process, and setting conditions of the twin-screw extruder are: an extrusion temperature is 120° C. to 270° C., a rotation speed of the screw is 70 rad/min to 90 rad/min, and a rotation speed of a lower hopper is 6 rad/min to 9 rad/min; and adopting a single-screw extruder to carry out the secondary melt blending process, and a temperature of the single-screw extruder is 190° C. to 200° C.

6. The preparation method according to claim 1, wherein a thickness of the composite board is 2 mm to 5 mm; in the supercritical fluid foaming process, a saturation temperature is 140° C. to 160° C., a saturation pressure is 2800 psi to 3000 psi, and a saturation time is 0.5 hours to 1.5 hours.

7. The preparation method according to claim 1, wherein the foaming material further comprises an antioxidant, and an amount of the antioxidant is 0.1 wt % to 1 wt % of a sum of a mass of the matrix polymer and a mass of the fiber-forming polymer.

* * * * *